United States Patent [19]

Shinoda et al.

[11] Patent Number: 5,489,474
[45] Date of Patent: Feb. 6, 1996

[54] DEGRADABLE ADHESIVE FILM AND DEGRADABLE RESIN COMPOSITION

[75] Inventors: Hosei Shinoda; Masami Ohtaguro; Shigeru Iimuro; Akihiro Funae; Shinobu Moriya, all of Aichi, Japan

[73] Assignee: Mitsui Toatsu Chemicals, Inc., Tokyo, Japan

[21] Appl. No.: 113,102

[22] Filed: Aug. 30, 1993

[30] Foreign Application Priority Data

| Sep. 4, 1992 | [JP] | Japan | 4-237288 |
| Sep. 28, 1992 | [JP] | Japan | 4-257999 |
| Oct. 21, 1992 | [JP] | Japan | 4-282938 |
| Mar. 23, 1993 | [JP] | Japan | 5-063601 |

[51] Int. Cl.$^6$ .............................. B32B 7/10; C08G 63/08
[52] U.S. Cl. ..................... 428/343; 428/355; 528/361; 528/354
[58] Field of Search .................... 428/343, 355; 528/361, 354

[56] References Cited

U.S. PATENT DOCUMENTS

| 3,527,841 | 9/1970 | Wicker, Jr. et al. . | |
| 4,742,140 | 5/1988 | Greenwood et al. | 526/245 |
| 5,076,983 | 12/1991 | Loomis et al. | 264/101 |
| 5,094,912 | 3/1992 | Deibig et al. | 428/355 |
| 5,206,341 | 4/1993 | Ibay et al. | 528/361 |
| 5,238,968 | 8/1993 | Morita et al. | 521/79 |
| 5,272,221 | 12/1993 | Kitao et al. | 525/420 |
| 5,296,282 | 3/1994 | Evers | 428/195 |

FOREIGN PATENT DOCUMENTS

| 153104 | 8/1985 | European Pat. Off. . |
| 426055 | 5/1991 | European Pat. Off. . |
| 435080 | 7/1991 | European Pat. Off. . |
| 49-36597 | 10/1974 | Japan . |
| 61-10242 | 1/1986 | Japan . |
| 62-501611 | 7/1987 | Japan . |
| 2-107684 | 4/1990 | Japan . |
| 2-300281 | 12/1990 | Japan . |

*Primary Examiner*—Jenna L. Davis
*Assistant Examiner*—Elizabeth M. Cole
*Attorney, Agent, or Firm*—Burns, Doane, Swecker & Mathis

[57] ABSTRACT

Articles which can be degraded and disappear in the natural environment are a degradable adhesive film which can be used for surface protection or indication after printing on the film surface and has an adhesive layer on one side of a substrate film obtained from a lactic acid base polymer such as polylactic acid and a lactic acid/hydroxycarboxylic acid copolymer having a molecular weight of 30,000–500,000, and a degradable resin composition which is excellent in weatherability and comprises 100 parts by weight of a lactic acid base polymer and 0.001–5 parts by weight of one or more additives selected from ultraviolet absorbers and light stabilizers.

11 Claims, No Drawings

DEGRADABLE ADHESIVE FILM AND DEGRADABLE RESIN COMPOSITION

BACKGROUND OF THE INVENTION AND RELATED ART

1. Field of the Invention

The present invention relates to a degradable adhesive film and a degradable resin composition. More particularly, the invention relates to a degradable resin composition used for the substrate of a polylactic acid based degradable adhesive film for surface protection which is used by being tentatively adhered on the surface of adherends including metal plates such as stainless steel and aluminum or their workpieces, resin coated woodboards, decorative laminates, wood and metal furniture and automotive bodies, or by being provisionally adhered on the surface of a semiconductor wafer in the fabrication step; a polylactic acid based degradable adhesive film for display which is printed or coated on the surface; a pressure-sensitive adhesive tape for vegetable tying materials and stationery products; and other degradable adhesive films for various uses.

2. Related Art of the Invention

Conventionally, adhesive films or tapes using films of polyvinyl chloride, polyolefin or an ethylene/vinyl acetate copolymer as substrate and mounting an adhesive layer on the substrate surface have been widely used as an adhesive film for surface protection which is used by being tentatively adhered on the surface of adherends including metal plates such as stainless steel and aluminum or their workpieces, resin coated woodboards, decorative laminates, wood and metal furniture, measuring instruments such as watches, and automotive bodies; as an adhesive film for semiconductor wafer fabrication which is used for protection by adhering on the wafer surface having a built-in semiconductor IC in the step of grinding or dicing the other surface (the back) of said wafer; and as an adhesive film for display which is printed or coated on the film surface.

For example, Japanese Laid-Open Patent HEI 2-107684 discloses a surface-protective film having an adhesive layer on one surface of a flexible vinyl chloride resin film comprising a high polymer plasticizer having a molecular weight of 500 or more. Japanese Laid-Open Patent SHO 61-10242 (U.S. Pat. Nos. 4,853,286 and 4,928,438) discloses an adhesive film for wafer fabrication which has an adhesive layer on the surface of substrate film such as an ethylene/vinyl acetate copolymer film or polybutadiene film which has a Shore-D hardness of 40 or less.

Japanese Patent Laid-Open Publication HEI 2-300281 discloses an adhesive film for protection which is tentatively adhered on the surface of an automotive body in order to prevent the surface from corrosion and deterioration by rain, dust or sea breezes during transportation and storage in the course of delivering new automotives (four- and two-wheeled painting-completed vehicles) to the customers. The adhesive film for automotive-protection is prepared by applying an adhesive to one surface of a film of general purpose resin such as polyethylene, polypropylene, polyvinyl chloride and an ethylene/vinyl acetate copolymer.

Conventionally, in the case of conducting a notice, advertisement or propagation by illustrating a letter, drawing, stamp or mark on a signboard and wall or decorating a car body or building, it is widely performed to stick on the above adherends said general purpose resin film which is printed, transcripted or painted with the letter etc.

As a result of the object for use, the above various adhesive films for surface protection are almost stripped and abandoned after protecting the surface for a prescribed period by sticking to the adherends. However, the above general purpose resin used for the substrate of these conventional adhesive films does not degrade or has a very slow degradation rate under the natural environment. Consequently, these films semipermanently remain when disposed after use by burying in soil, and impair the scenery or destruct the living environment of marine organisms when abandoned in the ocean. Further, these films require a large amount of energy for incineration and polyvinyl chloride films in particular have problems of developing toxic gas. As a result, waste disposal of these general purpose resin films has been a serious social problem.

A lactic acid base polymer has been already known as a hydrolyzable polymer or a bioabsorbable polymer. For example, Japanese Patent Publication SHO 49-36597 discloses an auxiliary surgical tool obtained from a lactic acid/glycolic acid copolymer consisting of 65~85% by weight of lactic acid units and 35~15% by weight of glycolic acid units. Japanese Patent Laid-Open Publication 62-501611 discloses a medical transplanting material obtained from a copolymer of caprolactone and lactide, a cyclic dimer of lactic acid.

Polylactic acid or a lactic acid/hydroxycarboxylic acid copolymer can be effectively hydrolyzed by atmospheric moisture and thus has recently been intended to apply to a fundamental component of degradable general purpose materials for disposable uses other than medical tools. Various information has already been obtained on the hydrolysis rate of polylactic acid and a lactic acid/hydroxycarboxylic acid copolymer. It is hence relatively easy to design materials so as to meet the degradation period required for disposable uses. For example, high molecular weight poly(L-lactic acid) is suited for a use period of about 6 months, and a lactic acid/glycolic acid copolymer is suited for uses where the use period is several days and quick decomposition is desired after use.

According to the knowledge of the inventors, however, outdoor use of conventional materials prepared from lactic acid base polymers such as polylactic acid and a lactic acid/hydroxycarboxylic acid copolymer generally leads to distinctly faster reduction of strength as compared with indoor use or uses in a dark place or living body. It has been found that phenomena such as embrittlement, rupture and disappearance occur earlier than expected. For example a film which was expected to hold its strength for at least 6 months at ambient temperature in view of information on the rate of hydrolysis was embrittled after outdoor use for about a month and could not perform its function any more. Further, the rate of acceleration of the decomposition could not be anticipated at all and the decomposition period was diversified.

As described above, earlier decomposition than prescribed degradation period sometimes results in a serious problem for utilizing a lactic acid based polymer such as polylactic acid and a lactic acid/hydroxycarboxylic acid copolymer as a degradable material. Such problem is a great disadvantage which cannot be overlooked at all.

SUMMARY OF THE INVENTION

The object of the invention is to provide a degradable adhesive film by using a substrate film which can be degraded and disappeared in a natural environment after use.

Another object of the invention is to provide a degradable adhesive film by using a substrate film which is excellent in weatherability and can be degraded and disappeared in a natural environment after use.

A further object of the invention is to provide a degradable adhesive film for use in surface protection, display, tying and stationary products by using a substrate film which can be degraded and disappeared in a natural environment after use.

A still further object of the invention is to provide a degradable molding-resin composition which has inhibited decomposition and excellent weatherability primarily in outdoor use.

That is, one aspect of the invention is a degradable adhesive film having an adhesive layer on the surface of a substrate film primarily consisting of a lactic acid base polymer, a degradable adhesive film having printing or a coating on the surface of a substrate film primarily consisting of a lactic acid base polymer and an adhesive layer on the other side of the substrate film, and a degradable resin composition having an excellent weatherability due to the addition of a specific amount of ultraviolet absorbers to a lactic acid base polymer.

The invention provides a degradable adhesive film having an adhesive layer on the surface of substrate film obtained from a lactic acid base polymer. The degradable adhesive film of the invention is prepared by forming a film with a lactic acid base polymer, coating an adhesive on one surface of the lactic acid base polymer film thus obtained, and drying to form an adhesive layer.

The invention also provides a degradable adhesive display film having an adhesive layer on the surface of a substrate film comprised of a lactic acid base polymer and comprising a letter, drawing, stamp or mark which is described by printing or painting said degradable film. Said degradable adhesive display film is prepared by printing or painting the surface of a lactic acid base polymer film obtained by forming the lactic acid base polymer, successively coating an adhesive on the other side of said films, and drying to form an adhesive layer.

The degradable adhesive film of the invention maintains a certain strength for a prescribed period and is hydrolyzed in the natural environment when abandoned after use. Thus, the film does not accumulate as waste matter. The film also has almost the same adhesive force as conventional adhesive films. Consequently, the film of the invention is useful as a degradable adhesive film for surface protection which is used by being tentatively adhered on the surface of adherends including metal plates or work pieces thereof, resin coated woodboards, decorative laminates, wood and metal furniture, measuring instruments such as watches and automotive bodies; as a degradable adhesive film for semiconductor wafer fabrication which is used for protection by adhering on the wafer surface having a built-in semiconductor IC in the step of grinding or dicing the other surface (the back) of said wafer; as a degradable adhesive display film which is printed and coated on the film surface; and as other pressure sensitive adhesive tapes for vegetable tying materials and stationery products.

Further, the invention provides a degradable resin composition comprising 100 parts by weight of a lactic acid base polymer and 0.001~5 parts by weight of one or more additives selected from ultraviolet absorbers and light stabilizers. Said degradable resin composition is prepared by mixing a lactic acid base polymer with a specific amount of auxiliary agents such as ultraviolet absorbers.

The degradable adhesive film of the invention has a characteristic of degrading in the natural environment because a film obtained by forming a lactic acid base polymer is used for a substrate film. Consequently, the degradable adhesive film of the invention can be degraded with ease when abandoned after use and does not accumulate as waste matters. Additionally, a lactic acid base polymer has active groups in the polymer chain and the film prepared from the polymer is hence excellent in coating properties of adhesiveness, printability by ink, and application properties of coating. As a result, the degradable adhesive film of the invention has good adhesion between the substrate film and the adhesive and can be printed or painted with ease on the surface. Further, no corona discharge treatment for enhancing the application properties of the substrate film surface is required and preparation steps of the adhesive film can be simplified.

The degradable resin composition of the invention is excellent in weatherability. Although the degradable product formed from the resin composition is used outdoors, the product exhibits the same degradation behavior as used indoors or in a dark place. The degradable product can maintain essential mechanical properties of the lactic acid base polymer during the use period and degrade after use on the basis of the essential hydrolytic properties, and is thus useful for a material of throwaway formed products which are mainly used outdoors.

DETAILED DESCRIPTION OF PREFERRED EMBODIMENTS

The present invention will hereinafter be illustrated in detail.

The term "Lactic acid base polymer" in the invention means polylactic acid or a copolymer of lactic acid with a hydroxycarboxylic acid.

L- and D- Isomers are present in lactic acid. When referred to simply as lactic acid, the term means L-lactic acid, D-lactic acid or a mixture of L- and D-lactic acid unless otherwise noted. A molecular weight of the polymer means a weight average molecular weight unless otherwise noted.

Polylactic acid which can be used in the invention includes poly (L-lactic acid) having structural units composed of L-lactic acid alone, poly(D-lactic acid) having structural units composed of D-lactic acid alone, and poly(DL-lactic acid) having L-lactic acid units and D-lactic acid units in an arbitrary ratio.

The lactic acid/hydroxycarboxylic acid copolymer which can be used in the invention is prepared from lactic acid including the above various lactic acids and hydroxycarboxylic acids including glycolic acid, hydroxyacetic acid, hydroxyvaleric acid, hydroxycaproic acid and hydroxyheptanoic acid.

Polylactic acid and the lactic acid/hydroxycarboxylic acid copolymer of the invention can be prepared by dehydration polycondensation of lactic acid or lactic acid and hydroxycarboxylic acid. Direct dehydration polycondensation includes a process for carrying out hot dehydration condensation of lactic acid or lactic acid and other hydroxycarboxylic acids preferably in a solvent and additionally conducting the reaction while removing formed water out of the reaction system. The homopolymers and copolymers of lactic acid can also be prepared by ring opening polymerization of lactide which is a cyclic dimer of lactic acid, glycolide which is a cyclic dimer of glycolic acid, and cyclic esters such as caprolactone, propiolactone, butyrolactone and valerolactone.

Formed products of a lactic acid base polymer are degraded in water or soil after abandonment and are also hydrolyzed during use by atmospheric moisture or water. Consequently, the molecular weight of the polymer in the substrate film used is an important factor. Tensile strength of the film depends upon the molecular weight. Low-molecular weight decreases tensile strength and high molecular weight increases tensile strength. However, too high molecular weight lowers processability and makes film forming difficult. Consequently, the molecular weight of the lactic acid base polymer used in the invention is in the range of 10,000~1,000,000, preferably 30,000~500,000.

In the case of polylactic acid, a sheet or film formed by extrusion or calendering sometimes can eliminate transparency due to progress of crystallization when these products are subjected to heat treatment such as vacuum forming, pressure forming, vacuum/pressure forming and heat setting. Polylactic acid having 100% by weight of L-lactic acid units or D-lactic acid units must be vacuum formed or pressure formed at relatively low temperatures such as 60°~90° C. in order to obtain transparent products. Such a narrow range of processing temperature is a disadvantage. Consequently, poly(DL-lactic acid) comprising L-lactic acid units and D-lactic acids units is preferred for preparing transparent products rather than poly(L-lactic acid) consisting of L-lactic acid units alone or poly(D-lactic acid) consisting of D-lactic acid alone. The composition of polylactic acid which can be preferably used is poly(L-lactic acid) or poly(DL-lactic acid) which comprises 50~100% by mole, preferably 70~100% by mole of L-lactic acid and poly(D-lactic acid) or poly(DL-lactic acid) which comprises 50~100% by mole, preferably 70~100% by mole of D-lactic acid.

In the case of a lactic acid/hydroxycarboxylic acid copolymer, degradability depends upon the content of lactic acid. A low content of lactic acid often leads to very slow or insufficient degradation when abandoned after use. Consequently, the content of lactic acid units is preferably 10% by mole or more.

Practically, a preferred composition of the lactic acid/ glycolic acid copolymer comprises 30–98% by mole of lactic acid units and 70~2% by mole of glycolic acid units. A more preferred composition comprises 70–98% by mole of lactic acid units and 30~2% by mole of glycolic acid units. A preferred composition of the lactic acid/hydroxycaproic acid copolymer comprises 10~98% by mole of lactic acid units and 90~2% by mole of hydroxycaproic acid units. A more preferred composition comprises 20~98% by mole of lactic acid units and 80~2% by mole of hydroxycaproic acid units.

The most suitable molecular weight and copolymer composition of the lactic acid base polymer used in the invention is arbitrarily selected from the above range so as to meet the longest adhesion time in respective use.

According to the knowledge of the present inventors, poly(L-lactic acid) having a molecular weight of 150,000 or more can be applied to a use-life of 6 months or more. Poly(L-lactic acid) having a molecular weight of 50,000 or more or poly(DL-lactic acid) having a molecular weight of 100,000 or more and comprising less than 5% by mole of D-lactic acid can be applied to a use-life of about a month.

The above polymers and additionally poly(DL-lactic acid) comprising less than 25% by mole of D-lactic acid units and a lactic acid/glycolic acid copolymer comprising less than 15% by mole of glycolic acid units can be applied to a use-life of from several days to a few weeks. Further, formed products which require high flexibility can be prepared, for example, from a lactic acid/hydroxycaproic acid copolymer comprising about 60% mole of hydroxycaproic acid units. In the case, the use-life of the formed product is about 3 months.

In the case of preparing a lactic acid base polymer by direct dehydrating polycondensation of lactic acid and hydroxycarboxylic acid, dehydrating condensation of L-lactic acid, D-lactic acid or a mixture of these acids, or dehydrating condensation of L-lactic acid, D-lactic acid or a mixture of these acids and hydroxycarboxylic acid is carried out in a reaction mixture containing an organic solvent preferably and substantially in the absence of water. Any of L-lactic acid, D-lactic acid and a mixture of these acids can be used for the raw material of the lactic acid base polymer.

The degradable resin composition of the invention can be obtained by mixing 100 parts by weight of a lactic acid base polymer with 0.001~5 parts by weight, preferably 0.05~5 parts by weight of one or more additives selected from ultraviolet absorbers and light stabilizers.

When the amount of the ultraviolet absorbers and light stabilizers is small, weatherability in outdoor use of the formed product becomes poor, that is, acceleration of degradation by exposure to ultraviolet rays cannot be sufficiently inhibited. On the other hand, too great an amount of these additives gives adverse effects on the essential properties of the lactic acid base polymer. Consequently, the amount of these additives is preferably in the above range.

Exemplary ultraviolet absorbers and light stabilizers which can be used in the invention include phenyl salicylate, p-tert-butylphenyl salicylate and other salicylate derivatives; 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane and other benzophenones; 2(2'-hydroxy-5'-methylphenyl)benzotriazole, 2-(2'-hydroxy-3',5'-di-tert-2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3",4",5", 6"-tetrahydrophthalimidomethyl)-5'-methylphenyl] benzotriazole, 2,2'-methylenebis[4-(1,1,3,3-tetramethylbutyl)-tetramethylbutyl-6-(2H-benzotriazole-2-yl)phenol and other benzotriazoles; oxalic anilide derivatives known as Sanduvor EPU (Trade Mark) and Sanduvor VSU (Trade Mark), 2-ethoxy-5-tert-butyl-2'-ethyloxalic bisanilide, 2-ethoxy-2-ethyloxalic bisanilide, 2,4-di-tert-butylphenyl 3,5-di-tert-butyl-4-hydroxybenzoate, 2-ethylhexyl 2-cyano-3,3-diphenylacrylate, 1,3-bis(4-benzoyl-3-hydroxyphenoxy)-2-propyl acrylate, 1,3-bis(4-benzoyl-3-hydroxyphenoxy)-2-propyl methacrylate, 2-hydroxy-4-methoxybenzophenone-5-sulfonic acid, methyl o-benzoylbenzoate, ethyl 2-cyano-3,3diphenylacrylate, 2-hydroxy-4-benzyloxybenzophenone, nickel dibutyldithiocarbamate, nickel thiobisphenol complex, nickel containing organic stabilizers, inorganic and organic complexes containing barium, sodium and phosphorus, semicarbazone based light stabilizers, zinc oxide based ultraviolet stabilizers and synergistic agents known as Sanshade (Trade Mark), bis(2,2,6,6-tetramethyl-4-piperidyl)sebacate, bis(1,2,2,6,6-pentamethyl-4-piperidyl)sebacate, 1-[2- {3-(3,5-di-tert-butyl-4-hydroxy-phenyl)propionyloxy} ethyl]-4- {3-(3,5-di-tert-butyl-4-hydroxyphenyl)propionyloxy}-2,2,6,6- tetramethylpiperidine, 8-benzyl-7,7,9,9-tetramethyl-3-octyl-1,2,3-triazaspiro[4,5]undecane-2,4-dione, 4-benzoyloxy-2,2,6,6-tetramethylpiperidine, dimethyl succinate/1-(2-hydroxyethyl)-4-hydroxy-2,2,6,6-tetramethylpiperidine polycondensate, poly[6-(1,1,3,3-tetramethylbutyl-)imino-1,3,5-triazine-2,4-diyl] [2,2,6,6-tetramethyl-4-piperidyl)-imino]hexamethylene[(2,2,6,6-tetramethyl-4-piperidyl)imino], 2-(3,5-di-tert-butyl-4-hydroxybenzyl)-2-n-butylmalonic bis(1,2,2,6,6-pentamethyl-4-piperidyl), tetrakis(2,2,6,6-tetramethyl-4-piperidyl) 1,2,3,4-butanetetracarboxylate, condensate of 1,2,3,4-butanetetracarboxylic acid, 1,2,2,6,6-pentamethyl-4-piperidinol and tridecyl alcohol, condensate of 1,2,3,4-butanetetracarboxylic acid, 2,2,6,6-tetramethyl-4-piperidinol and tridecyl alcohol, condensate of 1,2,3,4-butanetetracarboxylic acid, 1,2,2,6,6-pentamethyl-4-piperidinol and β, β, β', β', -tetramethyl-3,9-·(2,4,8,10-tetraoxaspiro [5,5]undecane) diethanol, condensate of 1,2,3,4-butanetetracarboxylic acid, 2,2,6,6-tetramethyl-4-piperidinol and β, β, β', β',-tetramethyl-3,9-(2,4,8,10-tetraoxaspiro [5,5]undecane) diethanol, 1,2,2,6,6-pentamethyl-4-piperidyl methacrylate, 2,2,6,6-tetramethyl-4-piperidyl methacrylate and other hindered amines.

Additionally, [2,2'-thiobis-(4-tert-octylphenolite)3-n-butylamine nickel and [2,2'-thiobis-(4-tert-octylphenolite)]2-ethylhexylamine nickel are unsuitable for the degradable polymer of the invention because these compounds sometimes lead to decomposition of polylactic acid and a lactic acid/hydroxycarboxylic acid copolymer in the mixing step.

Methods for preparing a degradable resin composition by mixing a lactic acid base polymer with ultraviolet absorbers and/or light stabilizers include a method for adding a prescribed amount of ultraviolet absorbers and/or light absorbers to the lactic acid base polymer and mixing with a mixer such as a ribbon blender and Henschel mixer in the vicinity of room temperature, a method for melting the lactic acid base polymer by heating to 100°~280° C. and kneading with a prescribed amount of ultraviolet absorbers and/or light stabilizers, and a method for dissolving the lactic acid base polymer and ultraviolet absorbers and/or light absorbers in solvents such as chloroform, methylene chloride, benzene, toluene, xylene, dimethyl formamide, dimethyl sulfoxide and dimethyl imidazolidinone and mixing the solutions thus obtained.

The degradable resin composition of the invention can be mixed with a plasticizer, antioxidant, heat stabilizer, lubricant, pigment and other additives, if desired, in addition to the above ultraviolet absorbers and light stabilizers.

Plasticizers which can be used include, for example, di-n-octyl phthalate, di-2-ethylhexyl phthalate, dibenzyl phthalate, diisodecyl phthalate, ditridecyl phthalate, diundecyl phthalate, diisooctyl phthalate and other phthalate derivatives; di-n-butyl adipate, dioctyl adipate and other adipate derivatives; di-n-butyl maleate and other maleate derivatives; tri-n-butyl citrate and other citrate derivatives; monobutyl itaconate and other itaconate derivatives; butyl oleate and other oleate derivatives; glycerol monoricinoleate and other ricinoleate derivatives; tricresyl phosphate, trixylenyl phosphate and other phosphate esters; and other low molecular weight plasticizers and high molecular weight plasticizers such as polyethylene adipate and polyacrylate.

In the above plasticizers, preferred plasticizers include glycerol triacetate (triacetine), lactic acid, lactide and lactic acid oligomers having a polymerization degree of 2~10.

The amount of a plasticizer which is added to the degradable resin composition is optionally selected depending upon the flexibility required for the formed product. Too much amount of addition leads to unfavorable bleeding out on the surface of the formed product. Consequently, the amount of the plasticizer is preferably in the range of 1~50, parts by weight, more preferably 5~20 parts by weight for 100 parts by weight of the lactic acid base polymer.

The lactic acid base polymer comprising the plasticizer is preferred to have low crystallinity in view of plasticizing efficiency and inhibition of bleeding out. Consequently, poly(D, L-lactic acid) or a lactic acid/hydroxycarboxylic acid copolymer is preferably used in the case of adding the plasticizer to the degradable resin composition.

The lactic acid base polymers which are more preferably used in the presence of the plasticizer are poly(D,L-lactic acid) comprised of 50~98% by mole of L-lactic acid and 50~2% by mole of D-lactic acid, poly(DL-lactic acid) comprised of 50~98% by mole of D-lactic acid and 50~2% by mole of L-lactic acid, a lactic acid/glycolic acid copolymer comprised of 98~30% by mole of lactic acid units and 2~70% by mole of glycolic acid units and a lactic acid/hydroxycaproic acid copolymer comprised of 08~10% by mole of lactic acid units and 2/90% mole of hydroxycaproic acid units.

These polymers are effectively plasticized with the plasticizer and can inhibit bleeding of the plasticizer.

Next, the degradable adhesive film of the invention will be explained.

The degradable adhesive film of the invention can be obtained by forming a substrate film from the above lactic acid base polymer through a known film-forming process, for example, solution-casting process, melt-extrusion process and calendering process, and by mounting an adhesive layer on one surface of the substrate film.

The degradable adhesive film is often used outdoors and thus and ultraviolet absorber and/or light stabilizer is preferably added to the substrate film. A very flexible substrate film containing the plasticizer is preferred depending upon uses. The antioxidant, heat stabilizer, lubricant, pigment and other additives can also be added.

Preparation of the substrate film by solution casting process is carried out by dissolving in solvents such as chloroform, methylene chloride, benzene, acetonitrile, toluene, xylene, dimethyl formamide, dimethyl sulfoxide and dimethyl imidozolidinone, casting the solution obtained on a flat surface, and removing the solvent from the solution.

In the melt-extrusion process, too low a kneading temperature leads to unstable extrusion and is liable to cause an overload. On the other hand, too high an extrusion temperature results in violent decomposition of the lactic acid base polymer and unfavorably generates molecular weight reduction, lowering of strength and discoloration. Consequently, the kneading temperature is in the range of preferably 100°~280° C., more preferably 130°~250° C. The extrusion die has a circular or linear slit and is in a temperature range almost the same as maintained in kneading.

Stretching after forming the film is not always necessary. If stretching is desired, the film is at least monoaxially stretched 1.1~10 times, preferably 2~7 times. Stretching temperature is selected from the range of 60°~210° C. depending upon the kind of the lactic acid base polymer used. Biaxial stretching is preferred in view of strength of the resulting film.

Thickness of the film is in the range of 10~2000μm, preferably 20~500 μm, more preferably 100~300 μm and suitable selected depending upon uses.

Mounting of the adhesive layer on the side of the film thus obtained is preferably carried out by coating the adhesive on the surface of the substrate film. Exemplary coating method includes conventionally known methods, for example, roll coating, dipping, brushing and spraying. These methods can spread the adhesive on the whole surface or a portion of the substrate film. Thickness of the adhesive layer is suitably determined depending upon the shape surface conditions and use of the adherend and generally has a preferred range of 2~200 μm.

After coating the adhesive, the substrate film is dried in an oven. The drying temperature differs depending upon the thickness of the substrate film, composition of the adhesive layer and is preferably 40°~180° C. more preferably 60°–120° C. A drying temperature lower than 40° C. cannot perform sufficient drying. On the other hand, a drying temperature exceeding 180° C. leads to shrinkage of the substrate film and unfavorably develops defects such as wrinkling.

Drying time differs depending upon the composition and thickness of the substrate film, kind of the adhesive and thickness of adhesive layer. It is usually preferred to continuously transfer through a drying oven at a rate of 2~100 m/min and have a residence time of 0.1~30 minutes in the drying oven.

Alternatively, a process which can be employed is to coat the adhesive by the above method on one side of a film such as a polypropylene film which has good releasability, dry the coated film to form an adhesive layer, successively laminate a substrate film, i.e. a lactic acid base polymer film on the surface of said adhesive layer and press the laminate to transfer the adhesive layer onto the substrate film.

The adhesive to be coated on one side of the substrate film includes for example, rubber base adhesives primarily comprising natural rubber and synthetic rubber, and synthetic resin based adhesives primarily comprising acrylic resin, silicone resin, urethane resin, epoxy resin, melamine resin, phenolic resin and vinyl acetate resin. Acrylic resin based adhesives are excellent in weatherability and particularly suitable for outdoor uses.

Exemplary acrylic resin based adhesives include copolymers obtained by copolymerizing primary components such as ethyl acrylate, butyl acrylate and 2-ethylhexyl acrylate with other vinyl monomers. The adhesives are exemplified by a solution based adhesive containing a uniform solution of said copolymer in an organic solvent and an aqueous emulsion based adhesive containing fine particles dispersed in water.

Particularly preferred adhesives are obtained by emulsion copolymerization of a monomer mixture containing an acrylic acid alkyl ester monomer and a monomer having carboxyl groups. If desired, more particularly preferred adhesives are obtained by emulsion copolymerization of a monomer mixture containing a vinyl monomer, polyfunctional monomer and internally crosslinkable monomer which are capable of copolymerizing with these monomers.

Acrylic acid alkyl ester monomers include, for example, methyl acrylate, methyl metharylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, nonyl acrylate, nonyl methacrylate, dodecyl acrylate and dodecyl methacrylate. The alkyl groups in the ester monomer can be straight or branched. The acrylic acid alkyl ester monomers can be used singly or as a mixture depending upon the object.

Monomers having carboxyl groups include, for example acrylic acid, methacrylic acid, crotonic acid, itaconic acid, maleic acid and fumaric acid. These monomers are preferably copolymerized in an amount of 0.1~10 parts by weight for 100 parts by weight of the monomers which constitute the acrylic resin based emulsion adhesive. The carboxyl groups in the adhesive react with the below described crosslinking agents to form a crosslinked structure. Thus, too small an amount of the monomers having carboxyl groups in the adhesive cannot form a satisfactory crosslinked structure, leads to shortage of cohesive force and is liable to transfer the adhesive onto the adherend. On the other hand, too large an amount of the monomers having carboxyl groups unfavorably makes the emulsion polymerization system unstable. Thus, the above range of amount is preferred.

Vinyl monomers which can copolymerize with acrylic acid alkyl ester monomer and the monomer having carboxyl groups include, for example, hydroxyethyl acrylate, hydroxyethyl methacrylate, hydroxypropyl acrylate, hydroxypropyl methacrylate, acrylamide, methacrylamide, dimethylaminoacrylate, dimethylaminomethacrylate, vinyl acetate, styrene and acrylonitrile.

Crosslinking agent, surface active agents and organic solvent can also be added to the adhesive, when desired. Preferred surface active agents are nonionic surfactants in order to prevent contamination and corrosion of the adherend. The amount of the agents is 0.01~50 parts by weight, preferably 0.1~10 parts by weight for 100 parts by weight of the adhesive. Addition of the surface active agents improves coating properties and is effective for inhibiting time-dependent viscosity increase of the adhesive sticking to the adherend.

Exemplary crosslinking agents include sorbitol polyglycidyl ether, polyglycol polyglycidyl ether, pentaerythritol polyglycidyl ether, trimethylolpropane polyglycidyl ether and other epoxy based resins; methylol melamine, melamine alkyl ether, melamine urea condensate, methylol alkyl ether containing urea-formaldehyde precondensate, guanamine resin and other melamine based resins; 1,1'-(methylene-di-p-phenylene)bis-3,3'-aziridinylurea, 1,1'-(hexamethylene)bis-3,3'-aziridinylurea, ethylenebis(2-aziridinylpropionate), tris(1-aziridinyl) phosphine oxide, 2,4,6-triaziridinyl-1,3,5-triazine, trimethylolpropanetris-(2-aziridinylpropionate) and other aziridine based resins.

The crosslinking agent is added to the above acrylic base resin as intact when the agent is soluble in water or as a solution in an organic solvent such as alcohol and acetone when the agent is insoluble in water. Accelerator such as organic tin compounds, organic lead compounds, organic cobalt compounds and amines can also be added in order to accelerate the crosslinking reaction. The amount of crosslinking agent differs depending upon the kind of crosslinking agents and adhesives and is preferably 0.01~20 parts by weight for 100 parts by weight of the adhesive. An amount of less than 0.01 parts by weight cannot sufficiently progress the crosslinking reaction. It is not required to add crosslinking agents exceeding 20 parts by weight in view of numbers of functional groups which participate in the crosslinking reaction in the adhesive layer.

Molecular weight of the adhesive is increased by addition of the crosslinking agents and thus time-dependent viscosity increase in the adhesive after sticking to the adherend, and can also prevent the adhesive from transfer to the adherend when the adhesive film is released from the adherend.

The degradable adhesive film of the invention which has been attached to the adherend for a prescribed period can be physically or mechanically released from the adherend and can also be removed by decomposition using acid or alkali.

Preferred acid includes hydrochloric acid and sulfuric acid. Preferred alkali includes sodium hydroxide and potassium hydroxide. An aqueous sodium hydroxide solution is particularly preferred. The adhesive film can also be heated in order to accelerate decomposition and removal. For example, the substrate film can be almost completely removed by treating at 60° C. for about an hour in a 1N aqueous sodium hydroxide solution.

The degradable adhesion film of the invention can be used as surface protection in the transportation and storage of metal plates such as stainless steel and aluminum or their workpiece, synthetic resin plates, synthetic resin molded articles, resin coated woodboards, decorative laminates, wood and metal furniture, and instruments such as watches.

The degradable adhesive film of the invention can be used for corrosion prevention in place of protective coating in order to prevent automobiles from corrosion during transportation and storage, particularly from corrosion by sea breezes in marine transportation. Both protective coating for transportation and storage and removing operation of the protective coating by use of a solvent become unnecessary by using the degradable adhesive film of the invention.

The degradable adhesive film of the invention can also be used for protecting a semiconductor wafer from rupture in the step of grinding or dicing the back. That is, IC is mounted on one side of the semiconductor wafer, the adhesive film of the invention is attached onto the side (the surface) having the built-in semiconductor circuit, and successively the other side (the back) of said semiconductor wafer is subjected to grinding and dicing. Stress developed by grinding and dicing can be absorbed by the degradable adhesive film and the rupture of the semiconductor wafer can thus be prevented.

In addition to the above uses, the degradable adhesive film of the invention is cut into a width of 5~50 mm and can be used as a degradable pressure-sensitive adhesive tape for stationery products and for tying vegetables such as spinach and spring onions.

Further, the degradable adhesive display film can be obtained by printing or painting one side of a film prepared from the lactic acid base polymer through the above method and successively mounting a adhesive layer on the other side of the film. Printing or painting can be applied to the surface where a adhesive layer is mounted, the surface where the adhesive layer is not mounted, or both of these surfaces.

Practical examples of printing and painting include letter, drawing, design, stamp and mark for indication, notification, advertisement and propagation. These printings and paintings can be manually drawn or mechanically printed. The degradable adhesive decoration film can be prepared by coating various colors of paint to the whole surface in place of the letter and drawing or by drawing a pattern.

The degradable adhesive display film which was printed or painted as above is adhered on a signboard or a building wall by way of the adhesive layer to carry out notification, indication, advertisement and propagation. Such method can eliminate operation for directly painting the signboard or building wall and can efficiently perform indication with ease in many places. Circumstances are also the same in the case of decorating car bodies and buildings.

Printing and painting can be carried out by using a coating compound, dye, ink, pigment, Japanese ink, and other known colorants. Colorants which can be used include, for example, offset printing ink, rotogravure ink (for polyethylene terephthalate, polyvinyl chloride and polystyrene), Japanese ink, paint, UV ink, heat set ink and cinnabar seal ink.

In the above inks and paints, oil inks and oil paints obtained by using a solvent such as chloroform, methylene chloride, benzene, toluene, xylene, dimethylformamide, dimethyl sulfoxide and dimethylimidazolidinone are unfavorable for use in the invention because these solvents dissolve the lactic acid base polymer.

The lactic acid base polymer film used in the invention comprises as a primary component a lactic acid base polymer having ester groups in the molecular structure and is excellent in coating properties of the adhesive and coating compound and printing properties of inks. Consequently, it is not required to carry out post treatment, for example, corona discharge treatment which is usually carried out for improving coating properties of the adhesive and coating compound in the case of a polyolefin base film, ethylene/vinyl acetate copolymer film and polybutadiene film.

EXAMPLES

The present invention will hereinafter be illustrated in detail by way of examples and comparative examples.

Preparation Examples 1~9

[Preparation of a lactic acid base polymer by ring-opening polymerization]

Marketed L-lactide (hereinafter referred to as L-LTD), DL-lactide (D-isomer 50 motes/L-isomer 50 moles, hereinafter referred to as DL-LTD) and glycolide (hereinafter referred to as GLD) were purified by recrystallizing 4 times from ethyl acetate, respectively. Marketed ε-caprolactone (hereinafter referred to as CL) was purified by drying on calcium hydride and distillation.

To a glass reaction vessel having a silane treated internal surface, the above L-LTD, DL-LTD, GLD, CL and a stannous octoate catalyst and a lauryl alcohol molecular weight control let were charged in amounts illustrated in Table 1 and Table 2. Lauryl alcohol was used in Preparation Examples 1 and 2. The mixture obtained was dried overnight under reduced pressure.

The reaction vessel was sealed under reduced pressure and the mixture was heated to the temperature illustrated in Table 1 and Table 2 and polymerized for a prescribed time. After finishing the reaction, the reaction mixture was dissolved in 20 times by weight of chloroform. The chloroform solution was poured into hexane having 5 times by weight of chloroform. Precipitated polymer was filtered and dried to obtain lactic acid base polymers P-1~P-9.

Molecular weight of the lactic acid base polymers thus obtained was measured by gel permeation chromatography (GPC) using chloroform as a solvent and calculated on the basis of reference polystyrene. Polymerization conditions and results of molecular weight measurement on these lactic acid base polymers obtained are illustrated in Table 1 and Table 2.

Preparation Examples 10~13

[Preparation of a lactic acid base polymer by direct dehydration polycondensation]

To a reaction vessel equipped with a Dean Stark trap, marketed 90% L-lactic acid (hereinafter referred to as LA), 90% D-lactic acid (hereinafter referred to as DA), glycolic acid (hereinafter referred to as GA) and hydroxycaproic acid (hereinafter referred to as HCA) were charged in amounts illustrated in Table 3, respectively. The mixture was heated with stirring at 150° C. for 3 hours under 50 mmHg while distilling off water. Successively 6.2 g of tin powder was added and the mixture was further stirred at 150° C. for 2 hours under 30 mmHg to obtain an oligomer. To the oligomer, 28.8 g of tin powder and 21.1 kg of diphenyl ether were added and an azeotropic dehydration reaction was carried out at 150° C. under 35 mmHg. Distilled water was separated from the solvent in a water separator and the solvent alone was returned to the reaction vessel. After 2 hours, the solvent which returned to the reaction vessel was changed to pass through a column packed with 4.6 kg of molecular sieve 3A before entering into the reaction vessel. The reaction was further continued for 40 hrs at 150° C. under 35 mmHg to obtain a polylactic acid solution.

The solution was diluted by adding 44 kg of diphenyl ether and cooled to 40 ° C. Precipitated powder was filtered, washed three times with 10 kg of n-hexane and dried at 60° C. under 50 mmHg. To the powder, 12.0 kg of 0.5N aqueous hydrochloric acid solution and 12.0 kg of ethanol were added, stirred at 35° C. for an hour, filtered and dried at 60° C. under 50 mmHg to obtain lactic acid base polymers P-10~P-13 in the form of powder. The yield was about 85%.

P-10~P-13 thus obtained were dissolved in chloroform and molecular weights were measured by GPC (polystyrene converted). Similarly, P-10 was dissolved in acetonitrile and measured by high performance liquid chromatography (HLC). Residual monomer content in the polymer was 0.2% by weight. Polymerization conditions and molecular weights of the lactic acid base polymers thus obtained are illustrated in Table 3.

Preparation Example 14

[Preparation of Plasticizer]

To 1.8 kg of L-lactide in a reaction vessel, 1.0 kg of an aqueous lactic acid solution having a concentration of 87% by weight was added and heated at 100° C. for 2 hours. After cooling the reaction mixture to room temperature, a transparent and viscous liquid was obtained. The oligomer thus obtained was dissolved in chloroform and molecular weight distribution was measured by GPC. Lactic acid and lactic acid oligomer was contained in the liquid reaction product. The average polymerization degree was 2.8. The product will hereinafter be referred to as LA-oligomer.

TABLE 2

|  | Preparation Example 6 | Preparation Example 7 | Preparation Example 8 | Preparation Example 9 |
|---|---|---|---|---|
| Lactic acid base polymer | P-6 | P-7 | P-8 | P-9 |
| L-LTD (wt part) | 100 | 70 | 75 | 50 |
| DL-LTD (wt part) | — | 30 | 20 | 50 |
| GLD (wt part) | — | — | 5 | — |
| Catalyst (wt %) | 0.015 | 0.015 | 0.015 | 0.015 |
| Polymerization temperature (°C.) | 110 | 120 | 120 | 120 |
| Polymerization time (hr) | 160 | 120 | 120 | 120 |
| Molecular weight (x 1000) | 376 | 410 | 280 | 354 |

TABLE 3

|  | Preparation Example 10 | Preparation Example 11 | Preparation Example 12 | Preparation Example 13 |
|---|---|---|---|---|
| Lactic acid base polymer | P-10 | P-11 | P-12 | P-13 |
| LA (kg) | 8.5 | 9.0 | 10.0 | 5.0 |
| DA (kg) | 1.5 | — | — | — |
| GA (kg) | — | 1.0 | — | — |
| CA (kg) | — | — | — | 5.0 |
| Oligomerization |  |  |  |  |
| Temperature (°C.) | 150 | 150 | 150 | 150 |
| Pressure (mmHg) | 30 | 30 | 30 | 30 |
| Time (hr) | 2 | 2 | 2 | 2 |
| Polymerization |  |  |  |  |
| Temperature (°C.) | 150 | 150 | 150 | 150 |
| Pressure (mmHg) | 35 | 35 | 35 | 35 |
| Time (hr) | 42 | 42 | 12 | 42 |
| Molecular | 110 | 110 | 36 | 70 |

TABLE 1

|  | Preparation Example 1 | Preparation Example 2 | Preparation Example 3 | Preparation Example 4 | Preparation Example 5 |
|---|---|---|---|---|---|
| Lactic acid base polymer | P-1 | P-2 | P-3 | P-4 | P-5 |
| L-LTD (wt part) | 100 | 100 | 90 | — | — |
| DL-LTD (wt part) | — | — | 10 | 80 | 40 |
| GLD (wt part) | — | — | — | 20 | — |
| CL (wt part) | — | — | — | — | 60 |
| Catalyst (wt %) | 0.010 | 0.015 | 0.030 | 0.015 | 0.015 |
| Molecular weight controller (wt %) | 0.15 | 0.30 | — | — | — |
| Polymerization temperature (°C.) | 180 | 180 | 120 | 120 | 120 |
| Polymerization time (hr) | 4 | 4 | 60 | 60 | 60 |
| Molecular weight (x 1000) | 152 | 88 | 427 | 165 | 99 |

TABLE 3-continued

|  | Preparation Example 10 | Preparation Example 11 | Preparation Example 12 | Preparation Example 13 |
|---|---|---|---|---|
| weight (x 1000) | | | | |

Examples 1–7 and Comparative Example 1–10

P-1, P-4 and P-5 which were obtained in the preparation examples were individually dissolved in chloroform in a concentration of 10% by weight. To the solution, 2-(2'-hydroxy-5'-methylphenyl)benzotriazole (hereinafter referred to as TP), 2-hydroxy-4-n-octoxybenzophenone (hereinafter referred to as HOB) or 4-dodecyloxy-2-hydroxybenzophenone (hereinafter referred to as DHB) were individually added in a prescribed amount illustrated in Table 4, Table 7 or Table 8. The mixture was thoroughly mixed and the resulting solution was cast on a glass plate and dried in the air. Successively, the solvent was completely removed by drying under reduced pressure to obtain a transparent film having a thickness of 100 μm.

P-2 and P-3 which were obtained in the preparation examples were melt-kneaded at 220° C. in a Brabender Plastograph. Bis(2,2,6,6-tetramethyl-4-piperidyl)sebacate (hereinafter referred to as HAL), TP or 2-(2'-hydroxy-3', 5'-di-tert-butylphenyl)benzotriazole (hereinafter referred to as T-320) was respectively added in a prescribed amount illustrated in Table 5 and Table 6 while melt-kneading P-2 or P-3. Polymer compositions thus obtained were hot-pressed at the temperature illustrated in Table 5 and Table 6 under pressure of 50 kg/cm² to obtain transparent films having a thickness of 0.5 mm.

In Examples 1–3 and Comparative Example 1, the film was allowed to stand outdoors by fixing at a place in the sun (the condition will hereinafter be simply referred to as outdoors). In Comparative Example 2, the film was allowed to stand outdoors in a covered box so as to prevent exposure from direct rays of the sun and exposed to rain (the condition will hereinafter the simply referred to as dark). A portion of the film was cut on the 24th day and the 44th day. Molecular weight of the cut piece was measured by GPC. Decomposition was distinctly inhibited in polymer compositions with addition of TP (Examples 1–3) as compared with a composition which was allowed stand outdoors without addition of TP. Particularly, Examples 2 and 3 exhibited almost the same level of decomposition as in the dark (Comparative Example 2). Results are illustrated in Table 4.

In Example 4 and Comparative Example 3, the films were allowed to stand outdoors as in Example 1. In Comparative Example 4, the film was allowed to stand in the dark as in Comparative Example 2. Tensile strength was measured on the films after passing prescribed days. Results are illustrated in Table 5.

TABLE 5

|  |  | Example 4 | Comparative Example 3 | Comparative Example 4 |
|---|---|---|---|---|
| Lactic acid base polymer |  | P-2 | P-2 | P-2 |
| Ultraviolet absorber or light stabilizer | Compound wt % | HAL + TP 0.5 + 0.5 | — 0 | — 0 |
| Press temperature (°C.) |  | 210 | 210 | 210 |
| Place |  | out door | out door | dark |
| Molecular weight | 0 day | 68 | 66 | 66 |
|  | 3 months | 65 | 49 | 63 |
|  | 6 months | 61 | 13 | 60 |

In Example 5 and Comparative Example 5, the films were allowed to stand outdoors. In Comparative Example 6, the film was allowed to stand in the dark. Tensile strength was measured on the films after passing prescribed days. Results are illustrated in Table 6.

TABLE 6

|  |  | Example 5 | Comparative Example 5 | Comparative Example 6 |
|---|---|---|---|---|
| Lactic acid base polymer |  | P-3 | P-3 | P-3 |
| Ultraviolet absorber or light stabilizer | Compound wt % | T 320 2.0 | — 0 | — 0 |
| Press temperature (°C.) |  | 190 | 190 | 190 |
| Place |  | out door | out door | dark |
| Molecular weight | 0 day | 61 | 63 | 63 |
|  | 3 months | 59 | 52 | 60 |
|  | 6 months | 53 | 36 | 55 |

In Example 6 and Comparative Example 7, the film was allowed to stand outdoors. In Comparative Example 8, the film was allowed to stand in the dark. Molecular weight was measured by GPC after 3 months on the films. Results are illustrated in Table 7.

TABLE 4

|  |  | Example 1 | Example 2 | Example 3 | Comparative Example 1 | Comparative Example 2 |
|---|---|---|---|---|---|---|
| Lactic acid base polymer |  | P-1 | P-1 | P-1 | P-1 | P-1 |
| Ultraviolet absorber or light stabilizer | Compound wt % | TP 0.005 | TP 0.1 | TP 5.0 | — 0 | — 0 |
| Place |  | out door | out door | out door | out door | dark |
| Molecular weight | 0 day | 152000 | 152000 | 152000 | 152000 | 152000 |
|  | 27 days | 109000 | 139000 | 149000 | 43000 | 133000 |
|  | 197 days | 36000 | 108000 | 129000 | *1 | 106000 |

Note
*1: Sampling was impossible by marked degradation

TABLE 7

|  | Example 6 | Comparative Example 7 | Comparative Example 8 |
|---|---|---|---|
| Lactic acid base polymer | P-4 | P-4 | P-4 |
| Ultraviolet absorber or light stabilizer  Compound  wt % | HOB 1.0 | — 0 | — 0 |

TABLE 7-continued

|  |  | Example 6 | Comparative Example 7 | Comparative Example 8 |
|---|---|---|---|---|
| Place |  | out door | out door | dark |
| Molecular weight | 0 day  3 months | 165000 38000 | 165000 8500 | 165000 39000 |

In Example 7 and Comparative Example 9, the films were allowed to stand outdoors. In Comparative Example 10, the film was allowed to stand in the dark. Molecular weight was measured by 6PC after 2 months on a portion of the films. Results are illustrated in Table 8.

TABLE 8

|  |  | Example 7 | Comparative Example 9 | Comparative Example 10 |
|---|---|---|---|---|
| Lactic acid base polymer |  | P-5 | P-5 | P-5 |
| Ultraviolet absorber or light stabilizer  Compound  wt % | | DHB 1.0 | — 0 | — 0 |
| Place |  | out door | out door | dark |
| Molecular weight | 0 day  2 months | 99000 96000 | 99000 39000 | 99000 95000 |

Examples 8~11

Ultraviolet absorbers illustrated in Table 9 were individually added to P-10~P-13 which were obtained in the preparation examples, and mixed with a Henschel mixer at room temperature to obtain lactic acid based resin compositions containing the ultraviolet absorbers. Successively, triacetin was added as a plasticizer to the lactic acid base resin compositions prepared from P-10 and P-11 in an amount illustrated in Table 9, and mixed with a Henschel mixer at 180° C. to obtain lactic acid based resin compositions containing ultraviolet absorbers and the plasticizer.

The lactic acid base resin compositions thus obtained were pelletized with a twin screw extruder. The pellets obtained were melt-extruded with a single screw extruder to obtain a film having a thickness of 150 μm. Decomposition of the films obtained were measured by the same method as carried out in Example 7. However, the films were allowed to stand for a month in Examples 10~11. Formulations, extruding temperatures and molecular weight change are illustrated in Table 9.

TABLE 9

|  |  | Example 8 | Example 9 | Example 10 | Example 11 |
|---|---|---|---|---|---|
| Lactic acid base polymer |  | P-10 | P-11 | P-12 | P-13 |
| Ultraviolet absorber or light stabilizer  Compound  wt % | | TP 0.1 | HAL + TP 0.5 + 0.5 | TP 1.0 | TP 1.0 |
| Triacetin | wt part | 5 | 5 | 0 | 0 |
| Extrusion temperature (°C.) |  | 180 | 180 | 180 | 160 |
| Place |  | out door | out door | out door | out door |
| Molecular weight | 0 day  1 months  2 months | 110000 — 101000 | 100000 — 88000 | 36000 33000 — | 70000 67000 — |

Preparation Example 15~19

[Preparation of Lactic Acid Base Polymer Film]

Ultraviolet absorbers illustrated in table 10 were respectively added to the lactic acid base polymers P-5 and P-7, P-9, mixed with a Henschel mixer at room temperature to obtain lactic base polymer compositions containing the ultraviolet absorbers.

Successively, triacetin was added to the compositions obtained from P-7 and P-8, and the LA-oligomer obtained in Preparation Example 6 was added to the composition obtained from P-9, respectively as a plasticizer in a proportion illustrated in Table 10. These mixtures obtained were blend with a plastomill at 150° C. in P-7 and P-8 and at 130° C. in P-9.

Sheets having a thickness of 1 mm were prepared by pressing these compositions thus obtained under pressure of 50 kg/cm² at 210° C. in P-6, 150° C. in P-7 and P-8, 130° C. in P-9, and at 100° C. in P-5. Successively, these sheets were individually deeply frozen with liquid nitrogen and crushed with a hammer mill to obtain granules of the lactic acid base polymer composition. These granules were successively melt-extruded with a single screw extruder and delivered through a T-die at the temperature illustrated in Table 10 to obtain lactic acid base polymer films F-1~F-5 having a thickness of 110~120 μm.

Formulations, extruding temperature and thickness of these films are illustrated in Table 10.

TABLE 10

|  |  | Preparation Example 15 | Comparative Example 16 | Comparative Example 17 | Comparative Example 18 | Comparative Example 19 |
|---|---|---|---|---|---|---|
| Lactic acid base polymer film |  | F-1 | F-2 | F-3 | F-4 | F-5 |
| Polymer | Compound | P-6 | P-7 | P-8 | P-9 | P-5 |
|  | wt part | 100 | 90 | 90 | 90 | 100 |
| Triacetin (wt part) |  | — | 10 | 10 | — | — |
| LA oligomer (wt part) |  | — | — | — | 10 | — |
| Ultraviolet absorber or light stabilizer | Compound | — | TP | TP | TP | DHB |
|  | wt % | 0 | 0.1 | 1.0 | 0.05 | 1.0 |
| Extrusion temperature (°C.) |  | 230 | 150 | 150 | 130 | 130 |
| Film thickness (μm) |  | 110 | 100 | 120 | 100 | 100 |

Example 12–16

[Preparation of Degradable Adhesive Film]

The lactic acid base polymer films F-1~F-5 which were obtained in Preparation Examples 15~19 were used as substrate films.

Separately, 91 parts by weight of butyl acrylate, 4 parts by weight of acrylonitrile, 2 parts by weight of methacrylic acid and 3 parts by weight of N-methylolmethacrylamide were emulsion polymerized in an aqueous medium to obtain acrylic base adhesive emulsion having a gel content of 87% by weight. An adhesive emulsion formulation was prepared by adding 0.5 part by weight of trimethylolpropane polyglycidyl ether to the emulsion for 100 parts by weight of the solid in the emulsion and heat-treating the mixture at 60° C. for 24 hours.

The adhesive emulsion formulation was applied to one side of the above substrate films F-1~F-5 with a reverse roll coater so as to obtain a dried thickness of 15 μm and dried at 70° C. for 30 minutes to form an adhesive layer. Adhesive was uniformly coated on the whole surface of substrate films and thus coating properties were good.

The coated films were individually wound into rolls on paper tubes so as to put the adhesive layer inside interposing release paper. Thus, degradable adhesive films F-1~F-5 were obtained and results of property evaluation are illustrated in Table 11.

Adhesive strength of the degradable adhesive films obtained in Examples 12~16 were evaluated by the following method.

Adhesive Strength

An adhesive film was adhered to a mirror stainless steel plate (# 800 ground) with a laminator under pressure of 1 kg/cm² and allowed to stand at 23° C. for 24 hours. Thereafter the film was pealed from the stainless steel at a peeling angle of 180 degrees with a pulling rate of 300 mm/min. Peeling stress was measured and the measured value was converted to a film width of 25 mm.

The film used for evaluation of adhesive strength was buried in soil at a depth of 20 cm for 12 months. Thereafter a molecular weight retention rate was measured by the following method. Results are illustrated in Table 11.

Molecular Weight Retention Rate

The substrate film portion of the adhesive film which was buried in soil for 12 months after use was dissolved in chloroform and measured molecular weight (polystyrene converted) by GPC. The difference from the molecular weight immediately before preparation was calculated by the following equation.

$$DW = 100 \, W_1/W_0$$

where

DW: molecular weight retention rate, $W_0$: molecular weight immediately before preparation, $W_1$: molecular weight after burying in soil for 12 months after use.

Tensile strength at break of the adhesive film HF-2 obtained in Example 13 was measured at a pulling rate of 50 cm/min. The tensile strength was 4.6 kgf/mm². The adhesive film HF-2 adhered to a mirror stainless steel plate (9 800 ground) with a laminator under pressure of 1 kg/cm² and allowed to stand at 23° C. for 21 days. Thereafter the film was peeled from the mirror stainless steel plate by the same peeling procedures as above. Peeling was favorably carried out with a peeling strength of 2.4 kgf/mm², which was sufficiently above the minimum tensile strength which can favorably peel the film from the stainless steel plate.

Comparative Example 11

A resin composition containing 100 parts by weight of polyvinyl chloride having an average polymerization degree of 1100, 35 parts by weight of dioctyl phthalate, 2 parts by weight of a complex stabilizer, 0.05 parts by weight of ultraviolet absorber TP and 1 part by weight of a complex fatty acid amide (stearylamide: palmitamide=7:3 by weight) was melt-processed with a calender to obtain a plasticized polyvinyl chloride film having a thickness of 100 μm.

An adhesive film HF-11 was prepared by carrying out the same procedures as described in Example 12 except that said flexible polyvinyl chloride film was used as a substrate film. Properties of the adhesive film HF-11 obtained was evaluated by the same methods as carried out in Example 12. Results are illustrated in Table 11.

The film was buried in soil for 12 months. Thereafter the film was dissolved in tetrahydrofuran and molecular weight retention rate was measured by GPC as carried out in Example 12. Results are illustrated in Table 11.

TABLE 11

|                                    | Example 12 | Example 13 | Example 14 | Example 15 | Example 16 | Comparative Example 11 |
|---|---|---|---|---|---|---|
| Self-adhesive film                 | HF-1  | HF-2  | HF-3 | HF-4  | HF-5  | HF-11 |
| Adhesive strength (g/25 mm)        | 108   | 104   | 99   | 109   | 103   | 105   |
| Molecular weight retention rate (%)| 16    | 11    | 10   | *1    | *1    | 98    |

Note
*1: Sampling was impossible by marked degradation

Example 17

The lactic acid base polymer film F-3 obtained in Preparation Example 17 was used for the substrate film of a degradable adhesive film.

Separately, 23 parts by weight of methyl methacrylate, 73 parts by weight of 2-ethylhexyl acrylate, 2 parts by weight of glycidyl methacrylate and 2 parts by weight of methacrylic acid were mixed. The monomer mixture thus obtained was emulsion polymerized in an aqueous medium to obtain an aqueous acrylic resin base emulsion adhesive having a solid content of about 47% weight.

An aqueous acrylic resin base emulsion adhesive formulation was prepared by adding to the above obtained emulsion adhesive 10 parts by weight of diethylene glycol monobutyl ether, 0.5 part by weight of polyoxyethylenenonylphenyl ether surfactant and 0.5 part by weight of trimethylolpropane polyglycidyl ether crosslinking agent for 100 parts by weight of the solid in the adhesive.

The formulation obtained above was coated with a roll coater on one side of the above substrate film and dried at 60° C. to obtain a degradable adhesive film HF-6 having an adhesive layer of 10 μm in thickness. Adhesive was uniformly coated over the whole surface of the substrate film, and thus coating properties were good.

The adhesive film HF-6 obtained was adhered on the surface of a semiconductor silicon wafer (6 inches in diameter and 600 μm in thickness) having a built-in IC. The back of said semiconductor silicon wafer was ground with a rotary surface grinder DEC 82 H/6 (Trade Mark of Disco Co.) under a wafer feed rate of 200 mm/min, abrasive grain size of 40/60 μm (first) and 20/30 μm (second), cooling water 5 l/min, and abrasion loss of 400 μm (600 μm→200 μm). After grinding, the film was removed and the wafer was washed with pure water.

The same procedures as above were repeated and the back of 100 semiconductor wafers were ground.

No rupture of the semiconductor silicon wafer was found at all in the grinding operation. It took about an hour for grinding and workability was good.

Adhesive strength of the above-obtained adhesive film HF-6 to the mirror silicon wafer was evaluated by the following method. Molecular weight retention rate was measured by the same method as carried out in Example 12.

Results are illustrated in Table 12.

Adhesive Strength

A film specimen having a width of 25 mm was adhered on the surface of a mirror silicon wafer with a rubber roller under pressure of 2 kg/cm² and allowed to stand at 23° C. under relative humidity of 50% for a prescribed time. Thereafter adhesive strength was measured with an Instron type universal tester by peeling the film specimen from the surface of the mirror silicon wafer at 23° C. with a peeling angle of 180 degrees under a pulling rate of 30 cm/min.

After testing adhesive strength, the adhesive film was buried in soil for 12 months. Thereafter molecular weight retention rate of the film was measured by the same method as carried out in Example 1. Results are illustrated in Table 12.

Comparative Example 12

An ethylene vinyl acetate copolymer (hereinafter referred to as EVA film) and polypropylene film were prepared by T-die extrusion process. Both films were laminated to obtain a two-layer lamination film having a thickness of 110 μm. A substrate film was prepared by conducting corona discharge treatment on the surface of EVA film layer of the lamination film. An adhesive film HF-12 was prepared by carrying out the same procedures as described in Example 17 except that the above-obtained substrate film was used.

Adhesive strength of the film HF-12 to the surface of mirror silicon wafer and molecular weight retention rate were measured by the method described in Example 17. Results are illustrated in Table 12.

TABLE 12

|  |  | Example 17 | Comparative Example 12 |
|---|---|---|---|
| Adhesive film |  | HF-6 | HF-12 |
| Adhesive strength (g/25 mm) | Immediately after adhesion | 63 | 60 |
|  | After 1 day | 78 | 80 |
|  | After 10 day | 125 | 120 |
| Molecular weight retention rate (%) |  | 12 | 97 |

Example 18

The degradable adhesive film HF-2 obtained in Example 13 was adhered to the whole roof portion of an automotive body (an overall coated new car). Said automotive body was allowed to stand outdoors for a month. Thereafter, the adhered film HF-2 was removed from the end of the film. The film could be peeled with ease without transfering the automotive coating to the adhesive film. The portion of automotive surface where the film was peeled off had no residue of the adhesive and maintained good gloss. Thus, the coated film was in good condition.

Example 19~22

Degradable adhesive films were prepared by furnishing an adhesive layer as carried out in Example 12 except that the lactic acid base polymer films obtained in Examples 8~11 were used as substrate films.

Coating properties of the adhesive to these substrate films were good in any cases. The degradable adhesive films obtained were individually adhered on mirror stainless steel plates and allowed to stand at 23° C. for a week. Thereafter these films could be favorably peeled from the stainless steel plates. The degradable adhesive film thus peeled were buried in soil and extremely degraded after 12 months.

Example 23~27

The lactic acid base polymer films F-1~F-5 obtained in Preparation Examples 15~19 were printed on one surface with an offset printing machine, Model RI-1 (Trade Mark of Mei Seisakusho Co.) by using an ink BEST-ONE-PROCESS-BLACK-H (Trade Mark of Touka Dystuff Chemical Industry Co.). The printed films were naturally dried by allowing to stand at room temperature under 40% relative humidity for 3 days. Printed state was good. Ink transfer amount estimated by transmission density was 1.3~2.9 g/m$^2$, which was almost the same as the transfer amount of a Mylar base photograying transparent film.

Separately, 91 parts by weight of butyl acrylate, 4 parts by weight of acrylonitrile, 2 parts by weight of methacrylic acid and 3 parts by weight of N-methylolmethacrylamide were emulsion polymerized in an aqueous medium to obtain an acrylic base adhesive emulsion having a gel content of 87% by weight. An adhesive emulsion formulation was prepared by adding 2 parts by weight of trimethylolpropane polyglycidyl ether to the adhesive emulsion for 100 parts by weight of the solid in the emulsion and heat-treating at 60° C. for 24 hours.

The adhesive emulsion formulation was coated on the back (the other side of the printed surface) of the above printed films with a reverse roll coater so as to obtained a dried thickness of 15 μm and dried at 70° C. for 30 minutes to install an adhesive layer. Thus, degradable adhesive indication films PF-1~PF-5 were obtained. The adhesive was uniformly coated over the whole surface of the substrate film and coating properties were good.

The degradable adhesive indication films PF-1~PF-5 thus obtained were individually wound into rolls on paper tubes so as to put the adhesive layer inside while interposing a release film. Ink transfer amount of PF-1~PF-5 was measured by the following method. Molecular weight retention rate was measured by the same method as described in Example 12. Results are illustrated in Table 13.

Ink Transfer Amount

Transmission density of a printed film was measured with a Macbeth Model TD-903 transmission densitometer. The ink transfer amount was estimated by comparing the measured density with transmission density of a film having a known amount of ink.

Comparative Example 13

A resin composition containing 100 parts by weight of a polyvinyl chloride having an average polymerization degree of 1100, 35 parts by weight of dioctyl phthalate, 2 parts by weight of a complex stabilizer, 0.05 part by weight of an ultraviolet absorber, BIOSORB-130 (Trade Mark of Kyodo Yakuhin Co.) and 1 part by weight of complex fatty acid amide (Stearyl amide: palmitamide=7:3 by weight) was melt-kneaded and rolled with a calender to obtain a plasticized polyvinyl chloride film having a thickness of 1110 μm.

A degradable adhesive indication film PF-R was prepared by carrying out the same methods of printing and adhesive coating as described in Example 23 except that the flexible polyvinyl chloride film obtained above was used as a substrate film. Properties of PF-R obtained were evaluated by the same method as described in Example 23 and results are illustrated in Table 13. The film was buried in soil for 12 months and then dissolved in tetrahydrofuran and molecular weight retention rate was measured by GPC as carried out in Example 23. Results are illustrated in Table 13.

TABLE 13

| | Example 23 | Example 24 | Example 25 | Example 26 | Example 27 | Comparative Example 13 |
|---|---|---|---|---|---|---|
| Self-adhesive film | PF-1 | PF-2 | PF-3 | PF-4 | PF-5 | PF-R |
| Substrate film | F-1 | F-2 | F-3 | F-4 | F-5 | Plasticized PVC film |
| Ink transfer amount (g/m$^2$) | 2.9 | 1.3 | 1.7 | 2.6 | 2.3 | 2.5 |
| Printed state | good | good | good | good | good | good |
| Adhesive Strength (g/25 mm) | 115 | 111 | 103 | 106 | 108 | 109 |
| Molecular weight retention rate (%) | 19 | 18 | 8 | *1 | *1 | 94 |

Note
*1: Sampling was impossible by marked degradation

Examples 28~31

Offset printing was carried out by the same procedures as described in Example 23 except that the lactic acid base polymer films obtained in Examples 8~11 were used as substrate films. Successively, the adhesive layer was installed on these printed films to obtain degradable adhesive indication films. Adhesive was uniformly coated over the whole surface of the substrate films and thus coating properties were good.

Ink transfer amount of these degradable adhesive indication films was measured by the same method as described in Example 23. Ink transfer amount was in the range of 1.6~2.8 g/m$^2$.

Examples 32~33

Rotogravure printing was carried out on one side of the lactic acid base polymer films F-1 and F-2 which were obtained in Preparation Example 15 and 16, respectively, with a baby type gravure printing machine by using a 35 μm solid plate for coating. Two component type ink for polyethylene terephthalate (PET) was used in Example 32.

Single component type ink for polystyrene was used in Example 33. After printing, the printed surface was dried with a household hair dryer. Printability and adhesive properties of ink were evaluated by the following methods. Results were good and are illustrated in Table 14.

The adhesive emulsion formulation was coated on the other side (the back of printed surface) of the printed films so as to obtain dried thickness of 15 μm by carrying out the same procedures as described in Example 23 and dried to install an adhesive layer. Thus, degradable adhesive indication films PF-6~PF-7 were obtained.

Adhesive strength and molecular weight retention rate after 12 months of PF-6~PF-7 were measured by the same methods as described in Example 23. Results are illustrated in Table 14.

Printability

A printed film sample was visually observed.

Printability was regarded as good when the printed ink had uniform density and lifting of ink, stripe or band unevenness of printing were not found on the surface.

Ink Adhesion

A cellophane tape NICHIBAN (Trade Mark of Nichiban Co.) having a width of 25 mm was adhered on the printed surface of dried film sample at the room temperature by pressing with fingers and immediately peeled off.

Adhesive properties were regarded as good when the printed ink was not peeled from the surface film.

TABLE 14

|  | Example 32 | Example 33 |
|---|---|---|
| Adhesive film | PF-6 | PF-2 |
| Substrate film | F-1 | F-2 |
| Ink | for PET | for polystyrene |
| Printability | good | good |
| Ink adhesion | good | good |
| Adhesive Strength (g/25 mm) | 103 | 112 |
| Molecular weight retention rate (%) | 21 | 16 |

The present invention may be practiced or embodied in still other ways without departing from the spirit or essential character thereof.

However, these examples are not intended to limit the scope of the present invention and the invention may be practiced or embodied in still other ways without departing from the spirit or essential character thereof.

We claim:

1. A degradable adhesive film comprising a substrate film obtained from a lactic acid base polymer and an adhesive layer on one side of the substrate film, wherein the substrate film comprises 0.001~5 parts by weight of at least one additive selected from the group consisting of an ultraviolet absorber and a light stabilizer for 100 parts by weight of the lactic acid base polymer, and the adhesive layer comprises an adhesive and 0.01~20 parts by weight of a crosslinking agent selected from the group consisting of epoxy based resins, melamine based resins and aziridine based resins for 100 parts by weight of the adhesive.

2. A degradable adhesive film of claim 1 wherein the lactic acid base polymer is one or more polymers selected from the group consisting of polylactic acid and a lactic acid/hydroxycarboxylic acid copolymer.

3. A degradable adhesive film of claim 1 wherein the lactic acid base polymer has a molecular weight of 30,000~500,000.

4. A degradable adhesive film of claim 2 wherein the polylactic acid is one or more polymers selected from the group consisting of poly(L-lactic acid) or poly(DL-lactic acid) having 50~100% by mole of L-lactic acid units and poly(D-lactic acid) or poly(DL-lactic acid) having 50~100% by mole of D-lactic acid units.

5. A degradable adhesive film of claim 2 wherein the lactic acid/hydroxycarboxylic acid copolymer is one or more polymers selected from the group consisting of a lactic acid/glycolic acid copolymer having 30~98% by mole of lactic acid units and 70~2% by mole of glycolic acid units, and a lactic acid/hydroxycaproic acid copolymer having 10~98% by mole of lactic acid units and 90~2% by mole of hydroxycaproic acid units.

6. A degradable adhesive film of claim 1 wherein the substrate film comprises 1~50 parts by weight of one or more plasticizers selected from the group consisting of glycerol triacetate, lactic acid, a lactic acid oligomer having polymerization degree of 2~10, and lactide for 100 parts by weight of the lactic acid base polymer. weight of the lactic acid base polymer.

7. A degradable adhesive film of claim 1 wherein the additives are one or more compounds selected from the group consisting of benzophenones including 2-hydroxy-4-n-octoxybenzophenone and 4-dodecyloxy-2-hydroxybenzophenone, benzotriazoles including 2-(2'-hydroxy-5'-methylphenyl)benzotriazole and 2-(2'-hydroxy-3',5'-di-tert-butylphenyl)benzotriazole, and sebacates including bis(2,2,6,6-tetramethyl-4-piperidyl)sebacate.

8. A degradable adhesive film of claim 1 wherein the adhesive is one or more compounds selected from the group consisting of a natural rubber based adhesive, a synthetic rubber based adhesive and a synthetic resin based adhesive.

9. A degradable adhesive film of claim 8 wherein the synthetic resin based adhesive is an acrylic resin based adhesive.

10. A degradable adhesive film of claim 9 wherein the acrylic resin is a copolymer comprising an acrylic acid alkyl ester and a monomer having a carboxyl group.

11. A degradable adhesive film of claim 1 wherein one or both sides of substrate film are printed or painted.

* * * * *

UNITED STATES PATENT AND TRADEMARK OFFICE
CERTIFICATE OF CORRECTION

PATENT NO. : 5,489,474

DATED: : February 6, 1996

INVENTOR(S) : Shinoda et al

It is certified that error appears in the above-identified patent and that said Letters Patent is hereby corrected as shown below:

Col.26, line 33-34, after "polymer." delete "weight of the lactic acid base polymer."

Signed and Sealed this

Twenty-sixth Day of November 1996

Attest:

BRUCE LEHMAN

Attesting Officer     Commissioner of Patents and Trademarks